United States Patent [19]

Hayakawa et al.

[11] Patent Number: 5,305,047
[45] Date of Patent: Apr. 19, 1994

[54] PATTERN PROJECTOR HAVING A MULTI-PORTION PROJECTION LENS AND CAMERA COMPRISING THE SAME

[75] Inventors: Shingo Hayakawa, Yokohama; Yasuo Suda, Kawasaki; Takeshi Koyama, Yokohama, all of Japan

[73] Assignee: Canon Kabushiki Kaisha, Tokyo, Japan

[21] Appl. No.: 62,711

[22] Filed: May 18, 1993

Related U.S. Application Data

[63] Continuation of Ser. No. 772,128, Oct. 9, 1991, abandoned, which is a continuation of Ser. No. 418,556, Oct. 10, 1989, abandoned.

[30] Foreign Application Priority Data

Oct. 11, 1988 [JP] Japan ................ 63-256312
Oct. 11, 1988 [JP] Japan ................ 63-256313

[51] Int. Cl.⁵ .................... G03B 13/36; G01J 1/20
[52] U.S. Cl. ........................... 354/403; 250/201.4
[58] Field of Search ................ 354/403–409; 356/1, 4; 250/201.4, 201.6

[56] References Cited

U.S. PATENT DOCUMENTS

| | | | |
|---|---|---|---|
| 4,371,261 | 2/1983 | Tsuji | 356/1 |
| 4,634,255 | 1/1987 | Suda et al. | 354/406 |
| 4,688,920 | 8/1987 | Suda et al. | 354/406 |
| 4,698,492 | 10/1987 | Ohtaka et al. | 250/201 |
| 4,699,493 | 10/1987 | Koyama et al. | 354/406 |
| 4,748,469 | 5/1988 | Tamura | 354/403 |
| 4,774,539 | 9/1988 | Suda et al. | 354/406 |
| 4,801,963 | 1/1989 | Koyama et al. | 354/403 |
| 4,841,326 | 6/1989 | Koyama et al. | 354/406 |
| 4,849,782 | 7/1989 | Koyama et al. | 354/408 |
| 4,859,842 | 8/1989 | Suda et al. | 250/201 |
| 4,878,078 | 10/1989 | Koyama et al. | 354/402 |

FOREIGN PATENT DOCUMENTS

| | | |
|---|---|---|
| 49-019810 | 2/1974 | Japan . |
| 54-159259 | 12/1979 | Japan . |
| 57-154206 | 9/1982 | Japan . |
| 62-247312 | 10/1987 | Japan . |
| 63-047710 | 2/1988 | Japan . |

Primary Examiner—W. B. Perkey
Attorney, Agent, or Firm—Fitzpatrick, Cella, Harper & Scinto

[57] ABSTRACT

A compact light projection system for auto-focus detection apparatus in which a stripe pattern is projected onto an object in a wide range. The light projection device comprises a chart having a pattern to be detected, an illuminating device for illuminating the chart, and a lens assembly for projecting the pattern. The lens assembly includes a first lens having an optic axis and second and third lenses having optic axes respectively inclining at a predetermined angle to the optic axis of the first lens.

12 Claims, 5 Drawing Sheets

PATTERN PROJECTOR HAVING A MULTI-PORTION PROJECTION LENS AND CAMERA COMPRISING THE SAME

This application is a continuation of U.S. application Ser. No. 07/772,128 filed Oct. 9, 1991, which is a continuation of U.S. application Ser. No. 07/418,556, filed Oct. 10, 1989, both now abandoned.

BACKGROUND OF THE INVENTION

1. Field of the Invention

The present invention relates to an automatic focusing projection system suitable for a silver chloride or video still camera, a cinecamera, a video camera, and the like, and, more particularly, to an automatic focusing projection system which can improve focusing precision in a passive or active automatic focusing system which is suitable for a focusing operation of a photographic system, by projecting a pattern image from a projection system toward an object and receiving the pattern image reflected by the object.

2. Related Background Art

Conventionally, focusing systems used in a still camera, a cinecamera, and a video camera can be mainly classified into two systems.

One system is a passive system proposed in Japanese Patent Laid-Open (Kokai) No. 54-159259, and the like, and the other system is an active system proposed in Japanese Patent Laid-Open (Kokai) No. 57-154206, and the like.

In the active system, infrared rays are projected from a camera toward an object, and rays reflected by the object are received. A projection system and a light-receiving system are synchronized to perform a focusing operation. When the object is dark or when the object has a low contrast, the focusing operation can still be precisely performed in the active systems. U.S. Pat. No. 4,371,261 is know wherein light points are projected at a large angle in order to expand a distance-measurement range in a passive focusing apparatus. However, in the active system, when an object is located at a remote place, the amount of reflected rays is decreased, and focusing precision is degraded.

In the passive system, a focusing state of an object formed by a photographing system is detected by a detection means arranged in a camera to perform a focusing operation. Even when an object is located at a remote place, a focusing operation can be performed with relatively high precision, and does not essentially require a projection system.

However, when an object is dark or when the object has a low contrast, focusing precision tends to be degraded in the passive system. A method of improvising this drawback is proposed in, e.g., Japanese Patent Publication No. 40-19810. In this patent, a predetermined pattern image is projected from a projection system of a camera toward an object, thereby increasing the luminance of the object or forming a pseudo contrast pattern on the object. An image reflected by the object in this state is detected to perform a focusing operation. The passive pattern projection system is not synchronized with a light-receiving system unlike the active system.

In recent years, a focusing system for measuring distances to a plurality of points of an object upon application of the above-mentioned two focusing systems has been proposed. In this case, the given pattern image is projected from a projection system to an object, and the pattern image reflected by the object is detected to perform a focusing operation. This system is effective, as a matter of course.

However, with this conventional method, it is difficult to project the pattern image onto a plurality of points on the object, which serve as distance-measurement points. In order to simultaneously project the pattern image onto the plurality of points, a large pattern image must be prepared in advance, and is formed in a wide range. Alternatively, a fine micropattern image is formed in a wide range using a projection lens having a short focal length and a wide-angle surface. In either case, in order to satisfactorily form the pattern image on the object having the distance-measurement points, an aberration of the projection lens must be satisfactorily corrected over a wide field angle. It is very difficult to realize such an operation with a compact arrangement. In the system of forming the large pattern image, a large light source for illuminating the large pattern image must be used, and a compact arrangement cannot be obtained. In the system of forming the pattern image in a wide range using the projection lens having a very short focal length, it is difficult to increase the size of an aperture of the projection lens. Therefore, it is difficult to sufficiently increase a possible distance of illumination light, and to form a fine micropattern image.

In order to solve these problems, a system using a plurality of illumination light sources in the system of forming the large pattern image has been proposed in Japanese Patent Laid-Open (Kokai) No. 63-47710. However, such an arrangement cannot solve a problem of aberration correction of the projection lens.

A projection system in which a projection lens as a means for illuminating a wide range on an object is constituted by a plurality of lens portions whose optical axes are offset from each other is proposed in Japanese Patent Laid-Open (Kokai) No. 62-247312 although it is used in a different application field. This prior art purposes to solve a problem of projecting a pattern image onto both a far object and a near object, i.e., a problem caused by an offset (parallax) between the optical axis of a projection system and the optical axis of a light-receiving system. The system proposed in this prior art can be applied in projection of a pattern image onto a plurality of distance measurement points.

However, since the projection lens is simply constituted by a plurality of lens portions whose optical axes are offset from each other, the problem caused by the parallax can be solved, but it is not easy to satisfactorily form a pattern image in a wide range corresponding to the plurality of distance-measurement points. U.S. Pat. application Ser. No. 382,029 now U.S. Pat. No. 4,907,026 is also known for the same application.

SUMMARY OF THE INVENTION

It is an object of the present invention to provide a projection system in which components of the projection system having a given pattern image are appropriately arranged, and the pattern image is projected onto a wide-range object with satisfactory focusing performance, and which is suitable for an automatic focusing system which performs distance-measurement of a plurality of points on an object.

According to the present invention, when a given pattern image is projected toward an object using a projection lens and the pattern image reflected by the object is received by a light-receiving system to perform a focusing operation of a photographing system, the projection lens is constituted by a lens portion having an optical axis for forming a pattern image in substantially the same direction as the optical axis of the photographing system, and one or a plurality of lens portions having optical axes for forming a pattern image in a direction different from the optical axis of the photographing system, and having apertures near the optical axes.

DETAILED DESCRIPTION OF THE PREFERRED EMBODIMENTS

Figure 1:
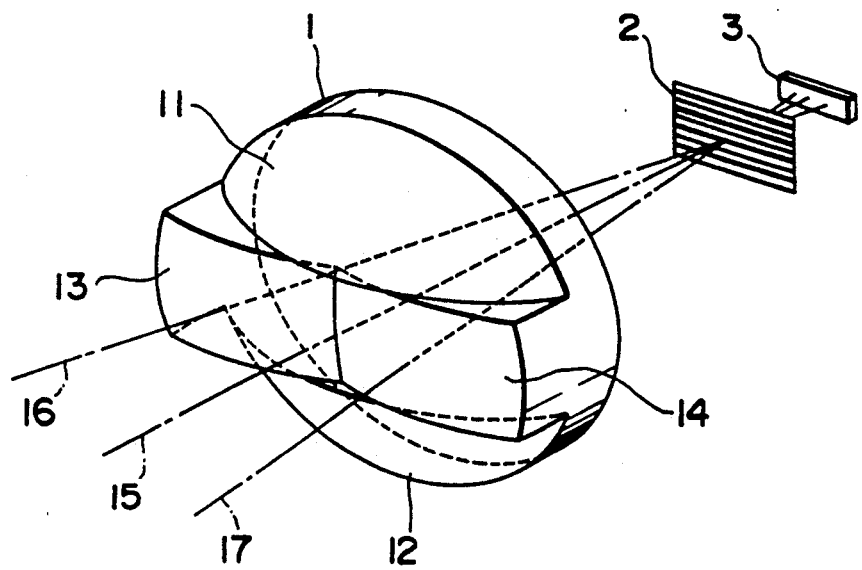
FIG. 1 is a perspective view showing a first embodiment of the present invention.

FIG. 1 is a perspective view of a projection system according to a first embodiment of the present invention. The projection system shown in FIG. 1 includes a projection lens 1, a pattern chart 2 having a stripe pattern extending in the horizontal direction, and a light source 3 such as an LED having a relatively large light-emitting unit. Note that a light-emitting region of the light source itself can be projected in a pattern.

The projection lens 1 has four convex lens portions, i.e., lens portions 11 and 12 having a common optical axis 15, a lens portion 13 having an optical axis 16, and a lens portion 14 having an optical axis 17, as shown in FIG. 1. These lens portions can be integrally formed by molded plastic.

In this embodiment, the projection lens 1 is constituted by the three optical axes 15 to 17 and the four lens portions 11 to 14, that is, the lens portions 11 and 12 having the optical axis 15 for forming a pattern image in substantially the same direction as the optical axis of a photographing system, i.e., an optical axis substantially parallel to the optical axis of the photographing system, the lens portion 13 having the optical axis 16 for forming a pattern image in a direction different from the optical axis of the photographing system, i.e., an optical axis inclined from the optical axis of the photographing system, and having an aperture near the optical axis 16, and the lens portion 14 having the optical axis 17 for forming a pattern image in a direction different from the optical axis of the photographing system and having an aperture near the optical axis 17. Normally, the optical axis 15 is perpendicular to the surface of the pattern chart 2.

Figure 2:
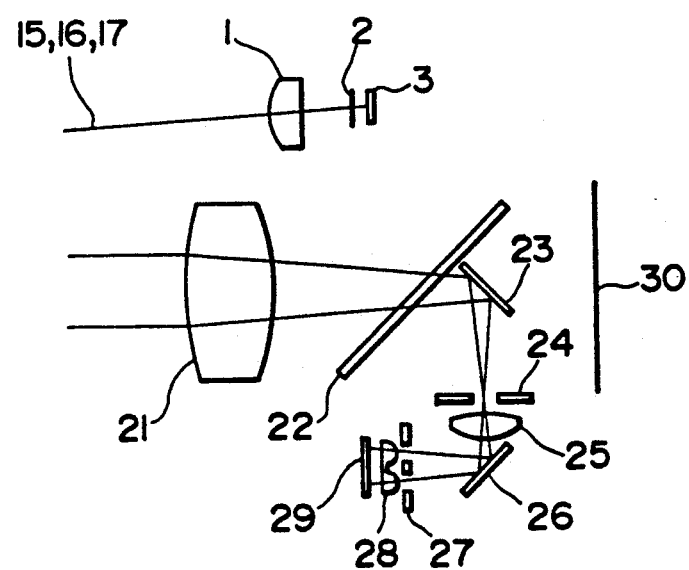
FIG. 2 is a schematic view showing an arrangement of an optical system when the present invention is applied to a single lens reflex camera.

FIG. 2 shows an arrangement of an optical system when the present invention is fixed in a single-lens reflex camera comprising a passive focusing apparatus or applied to a detachable pattern projector. In FIG. 2, reference numerals 1, 2, and 3 correspond to the projection lens, the pattern chart, and the light source shown in FIG. 1. Assume that the optical axes 15, 16, and 17 of the four lens portions of the projection lens 1 are expanded in a direction perpendicular to the drawing surface. The optical system shown in FIG. 2 includes a zoom lens or interchangeable photographing lens 21, a quick return mirror 22, a submirror 23, a field mask 24, a condenser lens 25, a total reflection mirror 26, a pupil split mask 27, a focusing lens 28, a light-receiving unit 29, and a film surface 30. A camera housing is omitted from FIG. 2. In this embodiment, a portion of an object image which is formed near the field mask 24 arranged near a prospective focal plane of the photographing lens 21 is formed again by the focusing lens 28 on the light-receiving unit 29 as two split images, and correlation calculations are performed using a signal train associated with the images to perform a focusing operation.

Figure 3:
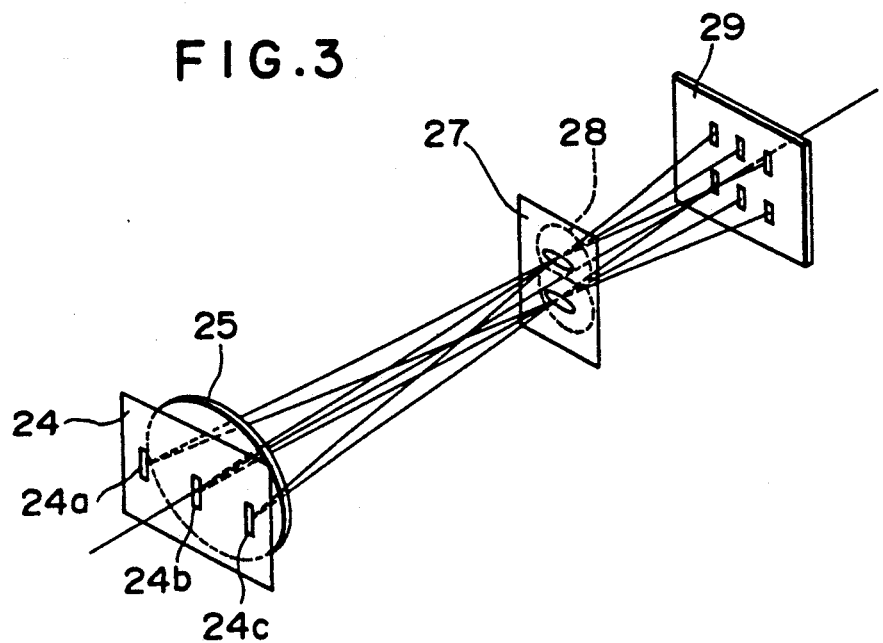
FIG. 3 is a perspective view of a focusing apparatus for performing distance-measurement of a plurality of points.

FIG. 3 is a perspective view of principal part constituting the focusing apparatus shown in FIG. 2. In FIG. 3, reference numerals 24 to 29 correspond to those in FIG. 2. In this embodiment, as shown in FIG. 3, the field mask 24 having three apertures in a direction perpendicular to the drawing surface of FIG. 2 is arranged, and object images formed near the apertures are split into two object images corresponding to two regions of an exit pupil of the photographing lens 21 by the condenser lens 25 and the focusing lens 28 having two lens portions, and are formed on the light-receiving unit 29. Distance-measurement is then performed for three regions corresponding to three apertures 24a, 24b, and 24c of the field mask 24 by a method of detecting a phase difference of optical patterns.

Figure 4:
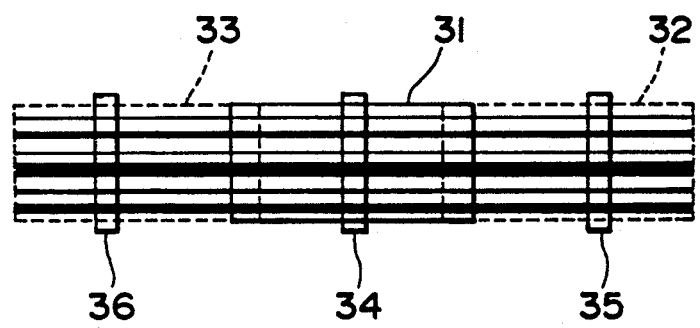
FIGS. 4 and 5 are explanatory views showing the positional relationship between a pattern image on an object and a distance-measurement field.
Figure 5:
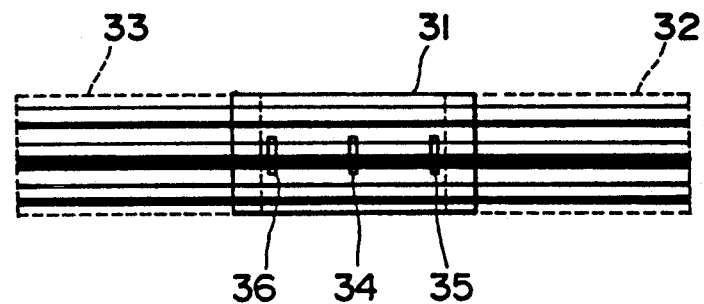

FIGS. 4 and 5 show the positional relationship between a pattern image projected onto an object and a distance-measurement field. FIG. 4 shows a case wherein the photographing lens comprises a wide-angle lens, and FIG. 5 shows a case wherein the photographing lens comprises a telephoto lens. In FIG. 4 or 5, pattern images 31, 32, and 33 are formed on an object by the projection lens, and form a continuous stripe pattern to slightly overlap each other. The pattern images 31, 32, and 33 are projection images of the pattern chart 2 by the lens portions 11, 12, 13, and 14 of the projection lens 1 in FIG. 1. In FIG. 4, images 34, 35, and 36 are obtained by reverse-projecting three distance-measurement fields shown in FIG. 3 onto an object when the photographing lens 21 shown in FIG. 2 comprises a wide-angle lens. In FIG. 5, the images 34, 35, and 36 are obtained by projecting the three distance-measurement fields in FIG. 3 onto an object when the photographing lens 21 shown in FIG. 2 comprises a telephoto lens. As shown in FIGS. 4 and 5, in the single-lens reflex camera comprising the focusing apparatus having a plurality of distance-measurement points like in this embodiment, in order to project a pattern onto a region on an object corresponding to the plurality of distance-measurement points, it is effective that the projection lens is constituted by the plurality of lens portions to form a plurality of pattern images on the object especially when a wide-angle lens is mounted or a zoom lens is set at a wide-angle side.

In this embodiment, as shown in FIGS. 1, 4, and 5, a stripe pattern is a combination of stripes having different widths. As normally used in the focusing apparatus shown in FIG. 2, the light-receiving unit 29 is assumed to be constituted by a plurality of one-dimensional line sensors, e.g., CCDs to allow easy detection of a contrast in an array direction of the sensors. In a phase difference detection focusing apparatus like in this embodiment, in order to allow easy contrast detection in the array direction of the sensors, a stripe pattern extending in a direction perpendicular to the array direction of the sensors is formed, and is projected onto an object.

Figure 6:
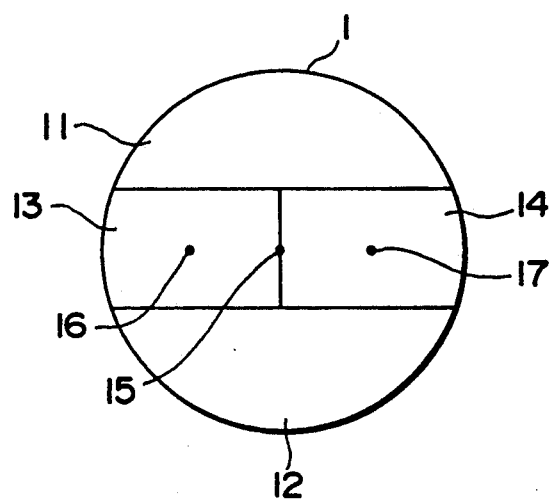
FIG. 6 is a front view of a projection lens according to the first embodiment of the present invention.

FIG. 6 is a front view of the projection lens 1 shown in FIG. 1 in order to explain the characteristic feature of this embodiment. In FIG. 6, reference numerals 11, 12, 13, and 14 correspond to the four lens portions in FIG. 1, and 15, 16, and 17 correspond to the three optical axes in FIG. 1. As shown in FIG. 6, according to the present invention, the lens portions for forming the pattern images in a direction different from the optical axis of the photographing lens are preferentially arranged at the central portion near the optical axis.

Normally, a focusing projection system is required to have a large aperture of a projection lens to project a pattern image over a far distance, to have a satisfactory focusing performance of a pattern image to increase a contrast of an object to be subjected to distance-measurement, and to have a compact arrangement. In order to satisfy these requirements, a projection lens conventionally has an aspherical surface to mainly correct an aberration on an optical axis. However, in order to form a pattern image on a wide-range object in a projection system of a focusing apparatus for measuring a plurality of distance-measurement points like in this embodiment, the projection lens is further required to satisfactorily correct aberrations outside the optical axis over a wide field angle. It is difficult to satisfy the above requirements by a conventional method in terms of aberration correction. Assume that a projection lens is provided with a lens portion for forming a pattern image in a direction different from the optical axis of a photographing lens which is arranged outside a lens portion, corresponding to a conventional projection lens, for forming a pattern image in substantially the same direction as the optical axis of the photographing lens in order to form a pattern image on an object in a wider range. In this case, if the optical axis of the lens portion for forming the pattern image in a direction different from the optical axis of the photographing lens is present within this lens portion, aberrations can be relatively easily corrected. In this case, however, since it is required to project a pattern image onto a far object in a wide range, the projection lens must have a large aperture and a short focal length. Therefore, the optical axis of the lens portion for forming a pattern image in a direction different from the optical axis of the photographing lens tends to be present within the lens portion for forming a pattern image in substantially the same direction as the optical axis of the photographing lens, and hence, it is difficult to correct aberrations. When the optical axis of the lens portion for forming a pattern image in the direction different from the optical axis of the photographing lens is present near the optical axis of the lens portion for forming a pattern image in substantially the same direction as the optical axis of the photographing lens, the lens portion for projecting the pattern image in the direction different from the optical axis of the photographing lens is preferentially arranged near the optical axis. In this case, the lens portion for forming a pattern image in substantially the same direction as the optical axis of the photographing lens loses an aperture portion near its optical axis. However, as for this lens portion, an axial aberration need only be mainly corrected, and this lens portion can be realized. When a pattern is arranged in a direction substantially perpendicular to the optical axis of the photographing lens and a plurality of images of this pattern are projected onto an object, a position where the pattern is arranged has a considerably large field angle with respect to the lens portion for forming a pattern image in the direction different from the optical axis of the photographing lens. In this case, it is difficult to correct aberrations. In this embodiment, therefore, the lens portion for forming a pattern image in the direction different from the optical axis of the photographing lens is preferentially arranged near its optical axis.

Figure 7:
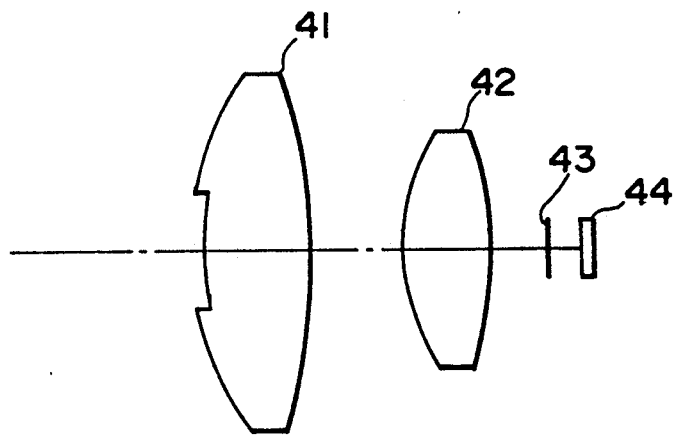
FIG. 7 is a sectional view of a second embodiment of the present invention.

FIG. 7 is a sectional view of a projection system according to a second embodiment of the present invention. The projection system in FIG. 7 includes a projection lens 41, an auxiliary lens 42, a pattern chart 43, and a light source 44. In this embodiment, the positive auxiliary lens 42 is arranged behind the projection lens to shorten a focal length of a projection optical system, so that a pattern image can be projected onto an object in a wider range.

Figure 8:
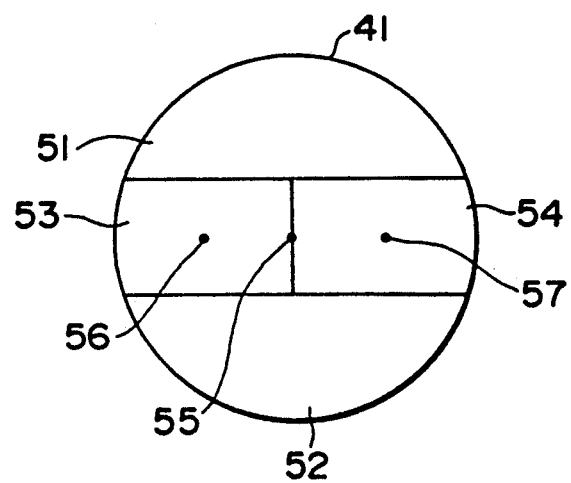
FIG. 8 is a front view of a projection lens according to the second embodiment of the present invention.

FIG. 8 is a front view of the projection lens 41 shown in FIG. 7. The projection lens 41 is constituted by four lens portions 51 to 54 in FIG. 7. In this embodiment, the projection lens 41 has almost the same shape as the projection lens 1 shown in FIG. 6, and lens portions for forming a pattern image in a direction different from the optical axis of the photographing lens are preferentially arranged near their optical axes.

In this embodiment, when a projection optical system is constituted by a plurality of lenses, it serves as an eccentric optical system for the lens portions for forming a pattern image in a direction different from the optical axis of the photographing lens. In this embodiment, since the lens portions for forming a pattern image in a direction different from the optical axis of the photographing lens are constituted by portions near the optical axes where a curvature becomes relatively moderate, aberrations can be relatively easily corrected in this case.

Figure 9:
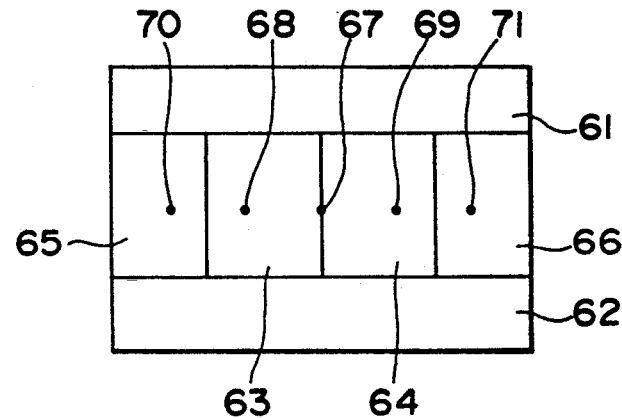
FIG. 9 is a front view of a projection lens according to a third embodiment of the present invention.

FIG. 9 shows another split method of an aperture of the projection lens. The projection lens shown in FIG. 9 is constituted by lens portions 61 and 62 having a common optical axis position 67, and lens portions 63 to 66 having optical axis positions 68 to 71. In this embodiment, the aperture split method of the projection lens shown in FIG. 6 is developed, so that the projection lens has the five optical axes. The optical axes 68 and 69 are symmetrical about the optical axis 67, and the optical axes 70 and 71 are symmetrical about the optical axis 67. The optical axes 70 and 71 define a larger angle than that defined by the optical axes 68 and 69 with respect to the optical axis 67. With the structure shown in FIG. 9, illumination in a wider range is allowed.

In the embodiments described above, the optical axes of the lens portions constituting the projection lens are aligned in a line to illuminate the distance-measurement points of the focusing apparatus shown in FIG. 2 or 3 since they are aligned in a line. Therefore, when a wide range which is not present in a line must be illuminated, the optical axis positions of the lens portions can be appropriately set in accordance with the illumination range.

Embodiments to be described below are concentrated on a focusing performance. When a stripe pattern image is projected toward an object by a projection lens, and the pattern image reflected by the object is received by a light-receiving system to perform a focusing operation, the projection lens is constituted by a plurality of lens portions which have elongated shapes extending in a stripe direction of the stripe pattern image and whose apex positions (optical axis positions) are offset from each other.

Figure 10:
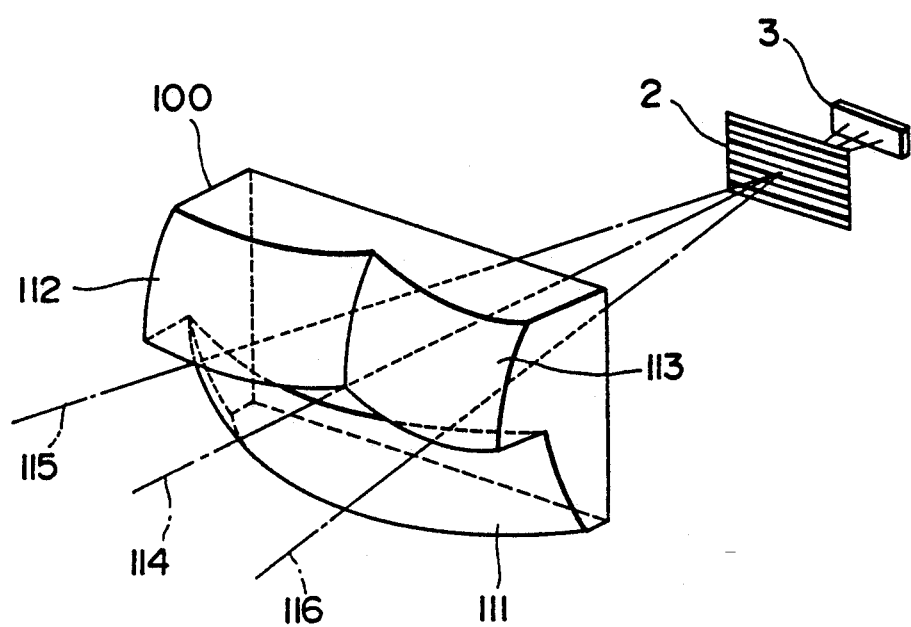
FIG. 10 is a perspective view of a fourth embodiment of the present invention.

FIG. 10 is a perspective view of a projection system according to a fourth embodiment of the present invention. The projection system shown in FIG. 10 includes a projection lens 100, a pattern chart 2 which has a stripe pattern extending in the horizontal direction, and a light source 3 such as an LED having a relatively large light-emitting unit. The projection lens 100 is constituted by three lens portions 111, 112, and 113 respectively having optical axes 114, 115, and 116. That is, as shown in FIG. 10, the projection lens 100 has the lens portion 111 having the optical axis 114, the lens portion 112 having the optical axis 115, and the lens portion 113 having the optical axis 116. The three lens portions 111, 112, and 113 of the projection lens 100 project the pattern image 2 in different directions.

The optical axes 114, 115, and 115 of the three lens portions of the projection lens 100 are expanded in a direction perpendicular to the drawing surface.

Figure 11:
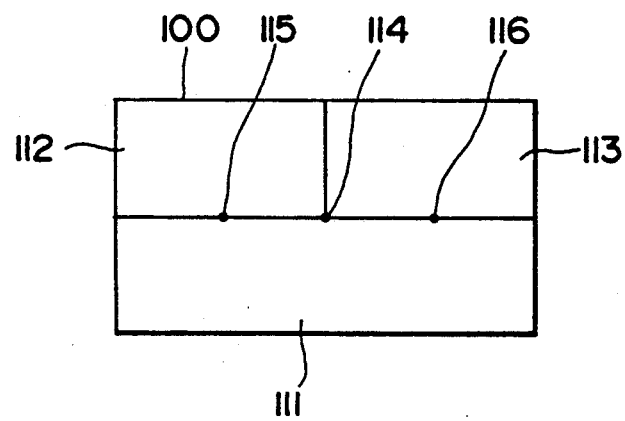
FIG. 11 is a front view of a projection lens according to the fourth embodiment of the present invention.

FIG. 11 is a front view of the projection lens 100 shown in FIG. 10 in order to explain the characteristic feature of this embodiment. In FIG. 11, reference numerals 111, 112, and 113 correspond to the three lens portions in FIG. 10. As shown in FIG. 11, the aperture of the projection lens is split into a plurality of lens portions each having an elongated shape extending in a left direction of FIG. 11, i.e., the stripe direction of the pattern.

When a conventional projection lens having a substantially circular aperture is used, it is often difficult to satisfactorily correct axial aberrations, such as a curvature of field, a coma, and the like, and a pattern image is blurred depending on the shape of the aperture of the projection lens. The shape of each lens portion of the projection lens is elongated in the direction of stripes constituting a stripe pattern and is shortened in a direction perpendicular thereto so that a pattern image can exhibit good focusing performance even when it is blurred depending on the shape of the aperture of the projection lens. According to the projection system of this embodiment, blurring of a pattern image caused by the aperture of the projection lens mainly occurs in the stripe direction of the stripe pattern, and does not often occur in the direction perpendicular thereto. Therefore, a focusing apparatus can satisfactorily perform a focusing operation since it utilizes a contrast in a direction perpendicular to the stripe pattern of the pattern image.

In the first embodiment, the lens portions 13 and 14 for projecting pattern images onto regions other than the central portion of an object are arranged near the central portion. The projection lens 11 has a symmetrical structure in the vertical direction to have sufficiently large apertures of the lens portions 13 and 14, so that an offset of each aperture from the optical axis is minimized. Thus, degradation of a focusing performance of a pattern image projected onto a region other than the central portion of the object is prevented.

Figure 12:
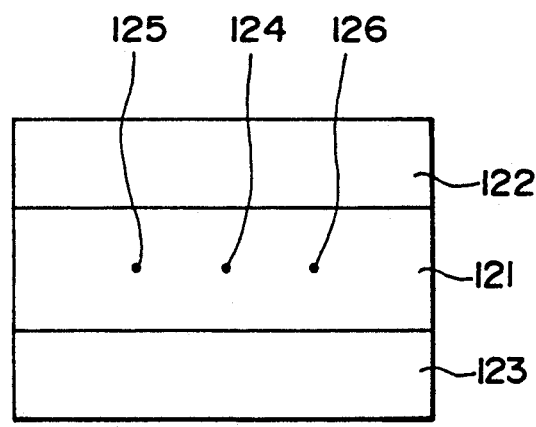
FIG. 12 is a front view of a projection lens according to a fifth embodiment of the present invention.

FIG. 12 shows still another split method of an aperture of the projection lens. The projection lens shown in FIG. 12 has three lens portions 121 to 123 having optical axis positions 124 to 126, respectively. When the projection lens is split into the lens portions having the shapes shown in this embodiment, since the lens portions have shapes elongated in a stripe direction of a stripe pattern and shortened in a direction perpendicular to the stripe direction, a better pattern image can be formed than the shapes shown in FIG. 10.

Figure 13:
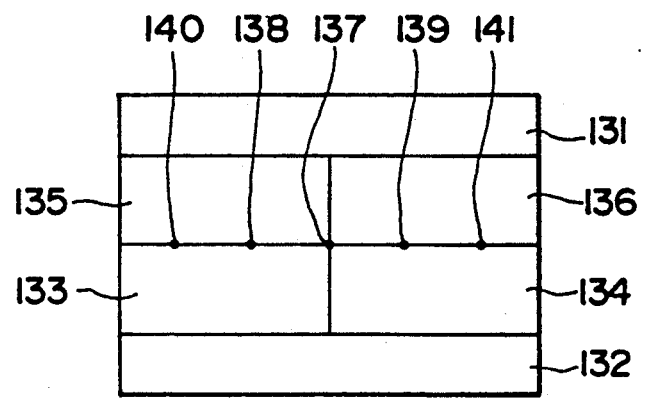
FIG. 13 is a front view of a projection lens according to a sixth embodiment of the present invention.

FIG. 13 shows still another split method of an aperture of the projection lens. The projection lens shown in FIG. 13 has six lens portions 131 to 136. The lens portions 131 and 132 have a common optical axis position 137, and the lens portions 133 to 136 have optical axis positions 138 to 141. In this embodiment, the split method of the aperture of the projection lens shown in FIG. 1 is developed so that the projection lens has five optical axes. With the structure shown in FIG. 13, illumination in a further wide range is allowed.

In the embodiments described above, the optical axes of the lens portions constituting the projection lens are aligned in a line to illuminate the distance-measurement points of the focusing apparatus shown in FIG. 2 or 3 since they are aligned in a line. Therefore, when a wide range which is not present in a line must be illuminated, the optical axis positions of the lens portions can be appropriately set in accordance with the illumination range.

Note that the above-mentioned automatic focusing projection system can be satisfactorily applied to either a passive or active system.

According to the present invention, as described above, a compact automatic focusing projection system which projects a stripe pattern image onto an object in a wide range with good focusing performance can be realized. In particular, the present invention is suitable for an automatic focusing projection system for performing distance-measurement of a plurality of points.

What is claimed is:

1. A pattern projection apparatus for projecting a pattern onto an object to detect a focusing state of an objective lens directed toward the object with a passive focusing apparatus, comprising:
   a chart having a pattern to be projected,
   an illumination device for illuminating said chart; and
   a lens assembly for projecting said pattern, said lens assembly comprising a first lens portion having a first optical axis, and second and third lens portions respectively having second and third optical axes which are inclined at a predetermined angle in opposite directions with respect to said first optical axis, said second lens portion including an intersection point of a lens surface of said second lens portion and said second optical axis, and said third lens portion including an intersection point of a lens surface of said third lens portion and said third optical axis, said first lens portion having a optical characteristic which is different than refractive characteristics of said second and third lens portions.

2. An apparatus according to claim 1, wherein a coupling together said second and third lens portions includes said first optical axis, and wherein said first lens portion comprises two sub-parts sandwiching said second and third lens portions.

3. An apparatus according to claim 1, wherein said second and third lens portions have substantially rectangular shapes.

4. An apparatus according to claim 1, wherein said first lens portion has a substantially rectangular shape.

5. An apparatus according to claim 1, wherein said pattern is disposed to cause pattern images projected from said first, second, and third lens portions to form a continuous image on an object surface.

6. A pattern projection apparatus for projecting a pattern onto an object to detect a focusing state of an objective lens directed toward the object with a passive focusing apparatus, comprising:

pattern providing means for providing an elongated pattern; and a lens assembly for projecting said pattern, said lens assembly comprising a first lens portion having a first optical axis, and second and third lens portions respectively having second and third optical axes which are expanded in an elongated direction of said pattern and are inclined with respect to said first optical axis, said second and third lens portions each having a shape cut in a direction perpendicular to the elongated direction of said pattern and in a direction along said first, second, and third optical axes.

7. An apparatus according to claim 6, wherein said first optical axis is located substantially on a boundary between said second and third lens portions.

8. An apparatus according to claim 6, wherein said elongated pattern is disposed so as to form a continuous image when said pattern is projected onto the object by said first, second, and third lens portions.

9. A camera system comprising:

a focusing apparatus for receiving rays passing through an objective lens, and for, when an object has a predetermined contrast, detecting a focusing state of the objective lens to form a signal for correcting the focusing state of the objective lens;

a projection lens assembly comprising a first lens portion having a first optical axis substantially parallel to an optical axis of the objective lens, and second and third lens portions respectively having second and third optical axis inclined in opposite direction with respect to said first optical axis, said second lens portion and said third lens portion being in contact; and a pattern carrier having an elongated pattern which is projected by said projection lens assembly so that an image reflected by the object is provided to said focusing apparatus, said first optical axis being substantially located on a boundary between said second and third lens portions.

10. A system according to claim 9, wherein said focusing apparatus includes a plurality of detection areas.

11. A system according to claim 9, wherein said projection lens further comprises fourth and fifth lens portions respectively having fourth and fifth optical axes which are inclined in opposite directions with respect to said first optical axis.

12. A projection apparatus for projecting a pattern onto an object to cause an image reflected by the object to be received by a focusing apparatus, comprising:

pattern providing means for providing an elongated pattern; and a projection lens assembly for projecting said pattern, said projection lens assembly comprising a first lens portion having a first optical axis, and a central lens portion having a plurality of lens portions including said first optical axis, said plurality of lens portions having a corresponding plurality of optical axes which are inclined with respect to said first optical axis, shapes of said plurality of lens portions being predetermined to project the elongated pattern such that a length of the projected pattern in the elongated direction is greater than a width of the projected pattern in a direction perpendicular to the elongated direction, indicia in said projected pattern extending in the elongated direction.

* * * * *

UNITED STATES PATENT AND TRADEMARK OFFICE
CERTIFICATE OF CORRECTION

PATENT NO. : 5,305,047
DATED : April 19, 1994
INVENTOR(S) : SHINGO HAYAKAWA, ET AL.

It is certified that error appears in the above-indentified patent and that said Letters Patent is hereby corrected as shown below:

COLUMN 1

Line 16, "like," should read --like;--.
    Line 18, "in" should read --(in--.
    Line 20, "system," should read --system)--.
    Line 39, "know" should read --known--.

COLUMN 2

Line 39, "pur-" should read --pro- --.

COLUMN 8

Line 47, "projected," should read --projected;--.

Line 64, "a cou-" should read --a region cou- --.

UNITED STATES PATENT AND TRADEMARK OFFICE
CERTIFICATE OF CORRECTION

PATENT NO. : 5,305,047

DATED : April 19, 1994

INVENTOR(S) : Shingo Hayakawa, et al.

It is certified that error appears in the above-indentified patent and that said Letters Patent is hereby corrected as shown below:

<u>COLUMN 10</u>

Line 5, "axis" should read --axes--.
Line 18, "lens" (first occurrence) should read --lens assembly--.

Signed and Sealed this

Thirty-first Day of January, 1995

*Attest:*

BRUCE LEHMAN

*Attesting Officer*   *Commissioner of Patents and Trademarks*